US010853386B2

(12) United States Patent
Suenderhauf et al.

(10) Patent No.: US 10,853,386 B2
(45) Date of Patent: Dec. 1, 2020

(54) SYSTEMS AND METHODS FOR CONFIGURABLE REPLICATION OF TIME DATA

(71) Applicant: SAP SE, Walldorf (DE)

(72) Inventors: Philipp Suenderhauf, Sandhausen (DE); Anna-Lena Spaegele, Wieslock (DE); Dirk Richtsteiger, Karlsruhe (DE); Christiane Konstandin, Walldorf (DE); Christoph Zakwieja, Heidelberg (DE); Jan Piechalski, Neckargemünd (DE)

(73) Assignee: SAP SE, Walldorf (DE)

( * ) Notice: Subject to any disclaimer, the term of this patent is extended or adjusted under 35 U.S.C. 154(b) by 345 days.

(21) Appl. No.: 15/730,205

(22) Filed: Oct. 11, 2017

(65) Prior Publication Data

US 2019/0108269 A1 Apr. 11, 2019

(51) Int. Cl.
*G06F 7/02* (2006.01)
*G06F 16/00* (2019.01)
(Continued)

(52) U.S. Cl.
CPC ............. *G06F 16/27* (2019.01); *G06F 3/065* (2013.01); *G06F 16/1873* (2019.01);
(Continued)

(58) Field of Classification Search
CPC .... G06F 16/1873; G06F 16/27; G06F 16/275; G06F 16/20; G06Q 10/10; G06Q 10/1093; G06Q 10/1091
See application file for complete search history.

(56) References Cited

U.S. PATENT DOCUMENTS

2007/0185939 A1\* 8/2007 Prahland ............... G06F 16/184
2016/0306849 A1\* 10/2016 Curino .............. G06F 16/24542
2017/0366609 A1\* 12/2017 Dieterich .............. G06F 16/178

OTHER PUBLICATIONS

"Integration Guide: Integrating Payroll Time Sheet with Employee Central Payroll Using Delta Transmission and Point-to-Point Replication", SAP SuccessFactors Employee Central, Document Version, Q2, May 20, 2016, 36pgs.
(Continued)

*Primary Examiner* — Bruce M Moser
(74) *Attorney, Agent, or Firm* — Buckley, Maschoff & Talwalkar LLC

(57) ABSTRACT

Performing data replication from a time management system. The method includes reading, by a replication controller, a replication configuration upon creation, modification, or deletion of a first data object. The configuration references a replication scenario of a defined set of replication scenarios, the replication scenario having one or more associated replication scenario objects. The method further includes creating, or changing a status of, a data replication proxy object if the first data object is an associated replication scenario object of the replication scenario, the data replication proxy object referencing the first data object. The method further includes receiving a query requesting instances of the data replication proxy object having a status of out of sync or deleted. The method further includes responding to the query with the instances of the data replication proxy object having the status of out of sync or deleted.

18 Claims, 8 Drawing Sheets

(51) Int. Cl.
    *G06F 16/27*     (2019.01)
    *G06Q 10/10*     (2012.01)
    *G06F 16/18*     (2019.01)
    *G06F 3/06*     (2006.01)
    *G06F 16/20*     (2019.01)

(52) U.S. Cl.
    CPC ..... *G06Q 10/1091* (2013.01); *G06Q 10/1093* (2013.01); *G06F 16/20* (2019.01)

(56) References Cited

OTHER PUBLICATIONS

"Integration Guide: Integrating Payroll Off and Employee Central Payroll—Setting up Leave Liability Replication for Australia", SAP SuccessFactors Employee Central, Document Version, Q2, May 19, 2017, 20pgs.

\* cited by examiner dataReplicationConfiguration replicationContentType

[Employee Absence Data,

Time Pay Components]

replicationScenario

FIG. 6 dataReplicationProxy replicationContentType

[Employee Absence Data,

Time Pay Components]

replicationScenarioObject

FIG. 7

| replication Scenario | Business View | | replication ScenarioObject | Technical View | |
|---|---|---|---|---|---|
| | Countries | Leave Info | | Creating Object | Data Format |
| A | e.g., Australia | Absence | A1 | Employee Time | IT2001 |
| | | Quota | A2 | Time Account Snapshot | IT2010 for Balance |
| | | Liabilities | | | IT2010 for Accruals IT2010 for Entitlements |
| B | e.g., Mexico | Absence | B1 | Employee Time | IT2001 + PTQUODED |
| | | Quota | B2 | Time Account | IT2006 |
| | | Liabilities | B3 | Time Account Details | PTQUODED |
| | | Payout | | | IT0416 |
| C | e.g., USA | Absence | C1 | Employee Time | IT2001 |

FIG. 8

SYSTEMS AND METHODS FOR CONFIGURABLE REPLICATION OF TIME DATA

FIELD OF THE INVENTION

The disclosed embodiments are directed to configurable replication of time data between data processing systems.

BACKGROUND

Conventional time data management systems store information relating to hours worked and leave taken for each employee. A conventional payroll system uses this information to produce payroll paystubs and financial statements. The software in these conventional systems may be used in many different countries around the world. However, conventional software may not have the capability to replicate data in a manner that is tailored for particular countries, while retaining compatibility with global requirements.

In particular countries, absence quotas, i.e., leave quotas, are used to manage an employee's time off. Various quota types (e.g., vacation or sick time) may be set up to allow the employee a particular number of hours or days off. An "accrual" is an amount of leave time credited to an employee's allowed time for a particular type of absence. An accrual can be characterized by: (1) how the amount to be credited is determined; and (2) the time frequency of the credit. The amount to be credited may be a constant amount or variable based on seniority, age, or other criteria in a company policy. The frequency of credit may vary from annually to daily. Accrued time may or may not be immediately available for use by employees. An "entitlement" is an amount of leave time currently available to an employee. This may or may not be the same as the accrued leave time, depending on the transfer time of the quota. The "transfer time" is the point at which an accrual amount is allotted to the entitlement portion of a quota, i.e., the time at which it can be used by the employee.

SUMMARY

In disclosed embodiments, systems and methods are provided to implement configurable replication of time data. The disclosed embodiments may include replication of employee time data from a time management system to a payroll processing system for the preparation of paystubs and financial reports.

In disclosed embodiments, systems and methods are provided to implement country-specific versions of time management and payroll processing software using configuration changes, rather than code modification. In such embodiments, the country-specific versions may be configured to be backward compatible with previous software versions. Disclosed embodiments may provide, for example, a country-specific version for Australia, where laws require reporting of leave liability, i.e., the liability a company faces based on employee paid leave, such as vacation, sick time, etc. The country-specific version for Australia may be configured to produce leave liability financial reports for a company based on, e.g., employee absences and the amount of leave to which employees are entitled but have not yet taken.

In disclosed embodiments, the system provides a process that replicates additional time information for leave liability from an employee time management system to a payroll processing system, which is an accounting requirement defined by Australian accounting standard AASB119.

In disclosed embodiments, the creation/modification of proxy object instances is triggered upon at least one of the following conditions: (i) when a data replication configuration is created or a creation job is triggered; (ii) when a Time Account Snapshot is saved; and (iii) when a Time Account Snapshot is deleted. The data replication controller may create or update the corresponding data replication proxies with the replication status "out of sync" or "deleted (out of sync)."

In disclosed embodiments, the payroll processing system may query the data proxy objects that are out of sync and valid for the replication process. This may be determined by a replication target system contained in the proxy object. The content may be passed to a web-based (e.g., SOAP) service.

In one aspect, the disclosed embodiments are a method, and corresponding system, of performing data replication from a time management system. The method includes reading, by a replication controller, a replication configuration upon any of creation, modification, and deletion of a first data object. The configuration references a replication scenario of a defined set of replication scenarios, the replication scenario having one or more associated replication scenario objects. The method further includes creating, by the replication controller, or changing a status of, a data replication proxy object if the first data object is an associated replication scenario object of the replication scenario. The data replication proxy object references the first data object. The method further includes receiving a query requesting instances of the data replication proxy object having a status of out of sync or deleted. The method further includes responding to the query with the instances of the data replication proxy object having the status of out of sync or deleted.

The disclosed embodiments may include one or more of the following features.

The method may include, in a payroll processing system, receiving time data referenced by the instances of the data replication proxy object having the status of out of sync or deleted; and storing, modifying, or deleting data in a payroll time database based at least in part on the received time data and statuses of instances of the data replication proxy object corresponding to the received time data. The method may include sending, to a data replication monitor of the time management system, confirmation messages for storing, modifying, or deleting of the data in the payroll time database. Each of the confirmation messages may be associated with a corresponding instance of the data replication proxy object. The data replication controller may delete, or change a status of, instances of the data replication proxy object corresponding the confirmation messages.

The time data may be received by an inbound queue of a time data web service of the payroll processing system. The received time data may be stored in the payroll time database as Infotype 2010 data. The received query may be a scheduled query using point-to-point messaging protocol. The replication scenario objects associated with the replication scenario may include an employee time object and a time account snapshot object. The employee time object may reference data specifying absences of an employee, and the time account snapshot object may reference data specifying leave which the employee has accrued or leave to which the employee is entitled.

BRIEF DESCRIPTION OF THE DRAWINGS

FIG. 6 shows fields of a data replication configuration object;

FIG. 7 shows fields of a data replication proxy object;

FIG. 8 is a table showing replication scenario and corresponding replication scenario objects;

DETAILED DESCRIPTION

Figure 1:
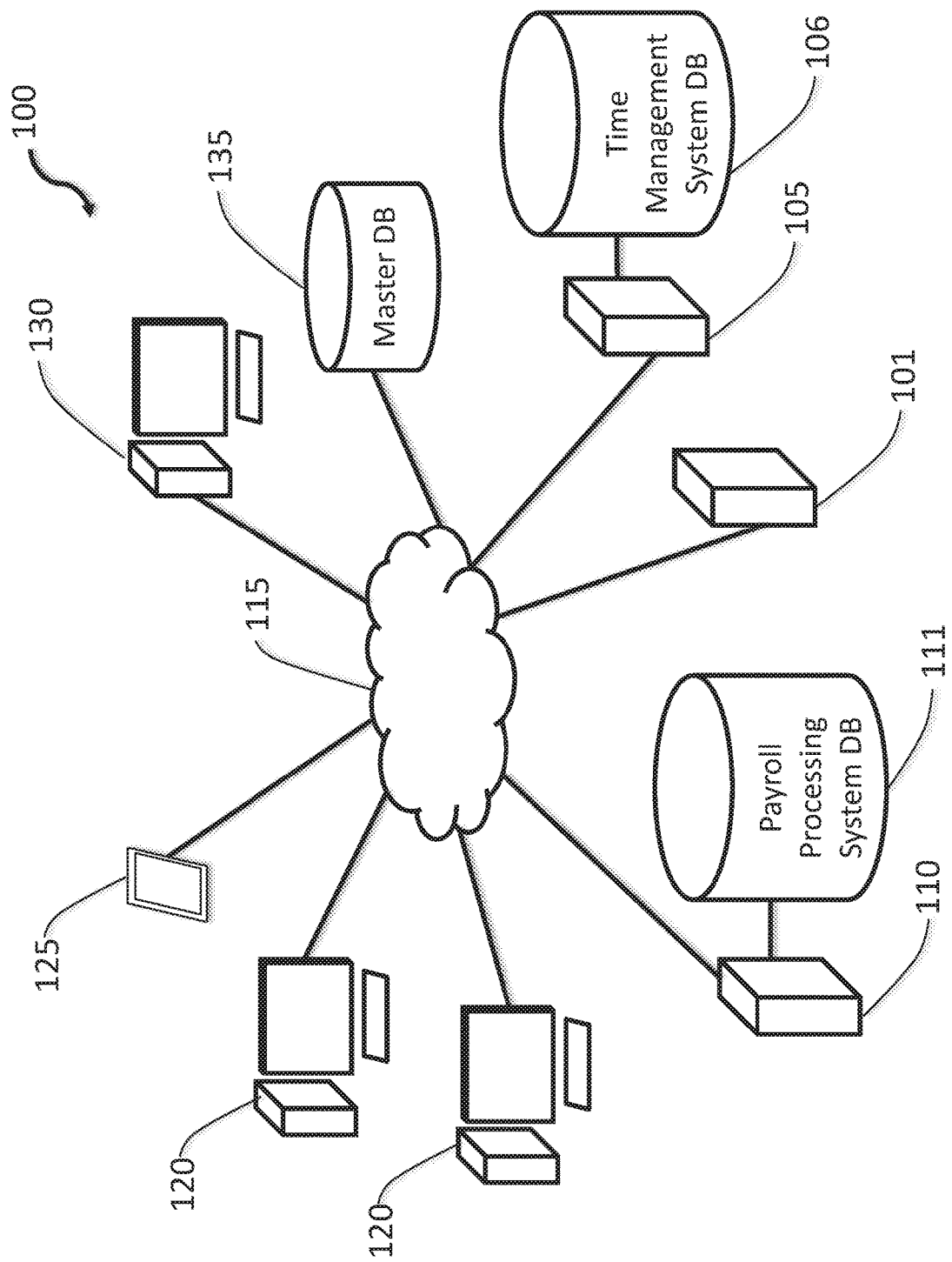
FIG. 1 is a block diagram of a system for performing configurable replication of time data.

FIG. 1 is a block diagram of a system 100 for performing configurable replication of time data. In disclosed embodiments, at least one data replication server 101 is adapted (e.g., through software running on one or more processors) to perform a replication of time data between a time management system 105 and a payroll processing system 110, which are connected via a network 115. The data replication server 101 may be part of the time management system 105 or may be a separate system. As discussed in further detail below, the replication can be configured to provide specific types of data to meet accounting requirements for particular countries or groups of countries.

The time management system 105 includes a database 106 which stores information input by employees relating to attendance (e.g., regular work hours and overtime hours) and absence (e.g., vacation, sick leave, etc.). The time management system 105 may be accessed via the network 115 using various devices, such as, for example, computers 120 and mobile devices 125. The time management system 105 may also be accessed by administrative personnel via Human Resources (HR) computer systems 130. The payroll processing system 110, which includes a database 111, stores, processes, and outputs paystub information and financial reporting information. The data replication server 101 performs configurable replication of data between the time management system database 106 and the payroll processing system database 111. The types and format of the data replicated between the databases can be controlled by changing a stored configuration, as discussed in further detail below.

A human resources master database 135, which stores employee information such as, for example, name, address, salary, bonuses, and bank account details, is also connected to the network 115. The master database 135 may be accessed via the network 115 by administrative personnel, e.g., using one or more HR computer systems 130. The data replication server 101 (or servers), and/or the payroll processing system 110, may be configured to access the HR master database 135 to obtain data for producing paystub and financial reporting information. In disclosed embodiments, the payroll processing system 110 may receive data replicated from the HR master database 135, rather than accessing the HR master database 135 directly. In disclosed embodiments, the master database 135 may be a joint database in combination with the time management system database 106, in which case there may be a joint system controlling the two databases. Alternatively, the master database 135 and time management database 106 may be separately implemented and controlled.

Figure 2:
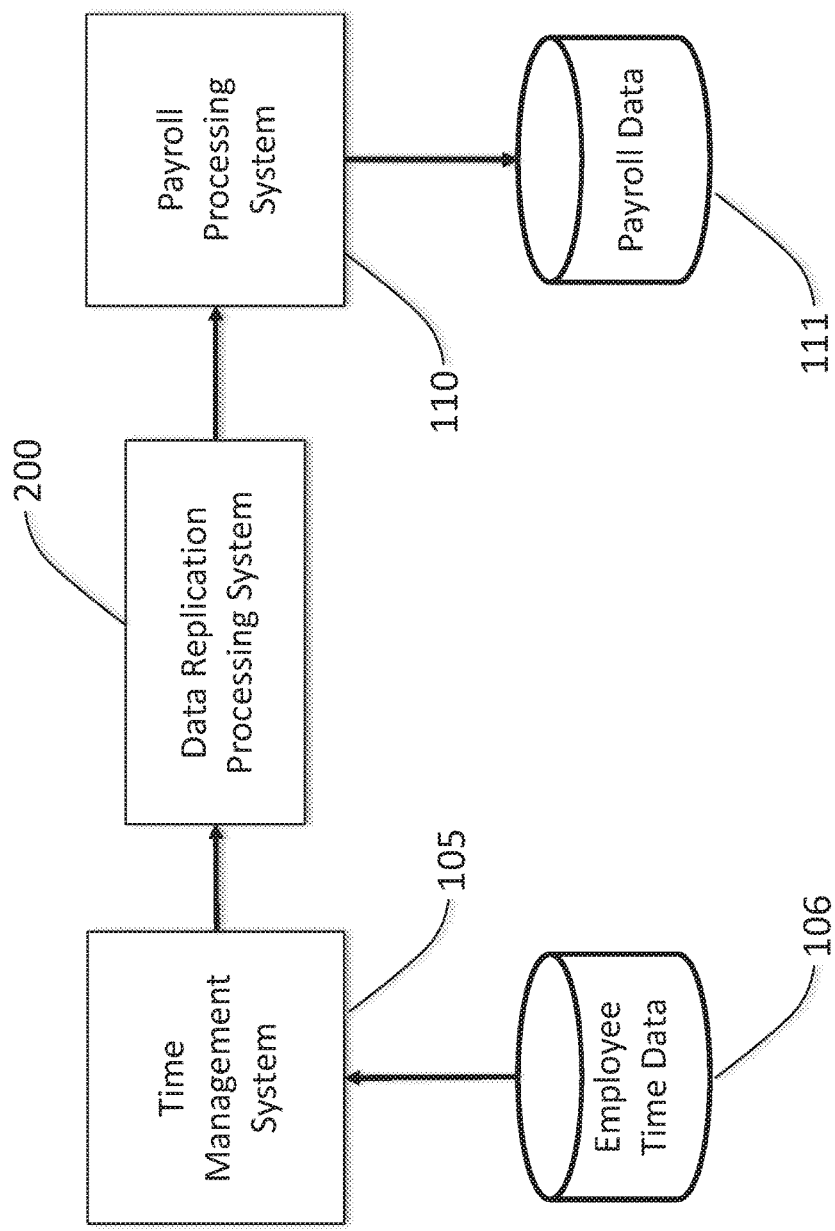
FIG. 2 is a high-level block diagram of a data replication processing system.

FIG. 2 is a high-level block diagram of a data replication processing system 200. Time data stored in the employee time database (e.g., time management system database 106) are retrieved by the data replication processing system 200 (which includes, e.g., at least one data replication server 101). The data replication processing system 200 monitors and controls the replication of the employee time data to the payroll processing system 110, where it is used along with payroll data (e.g., payroll processing system database 111) to generate payroll stubs and financial reports. In disclosed embodiments, the data replication processing system 200 may be implemented as part of the time management system 105. Alternatively, the data replication system 200 may be implemented as a separate system.

Figure 3:
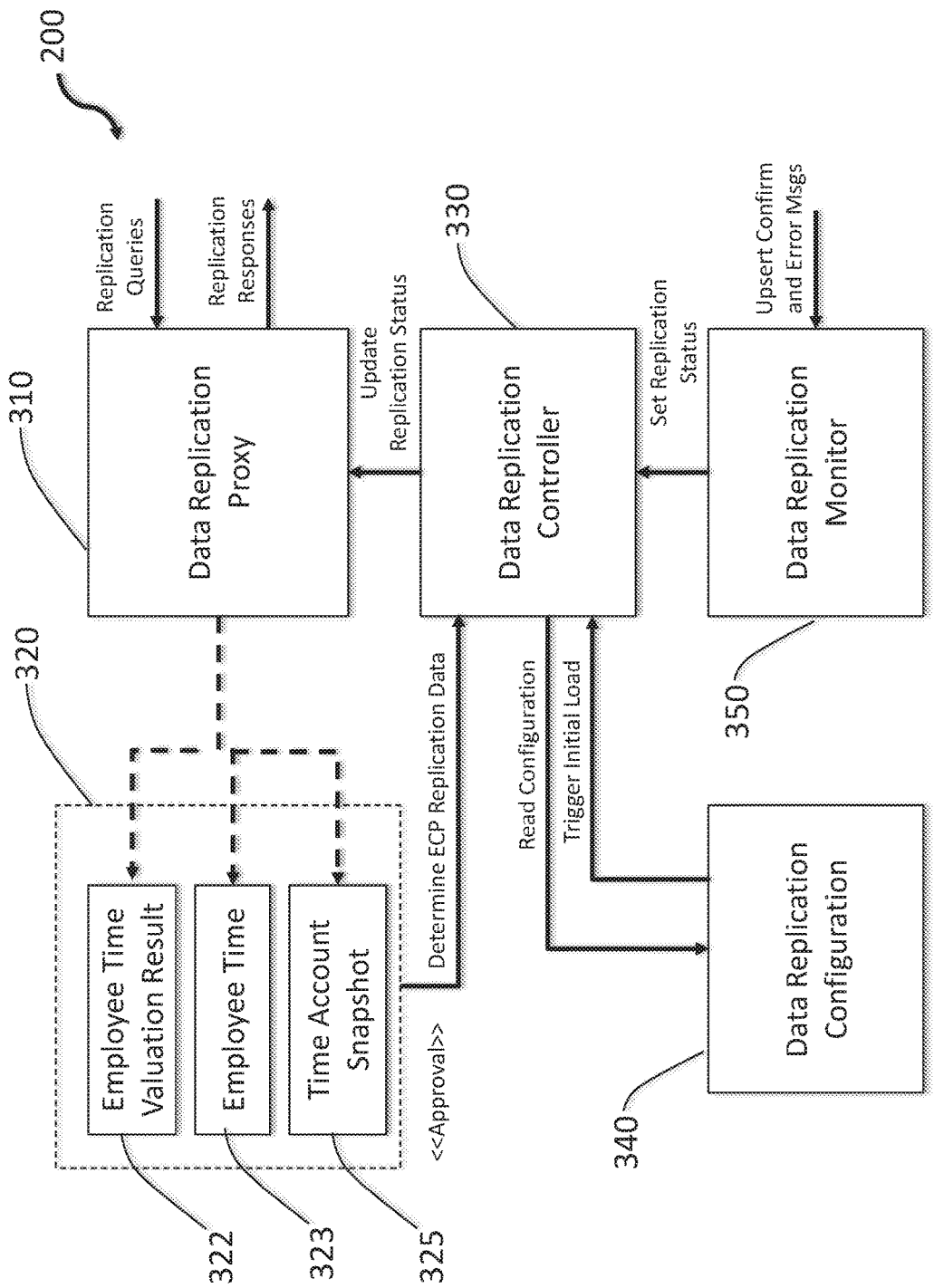
FIG. 3 is a block diagram of a data replication processing system.

FIG. 3 is a block diagram of a data replication processing system 200. Employee time data from the time management system database 106 (see FIGS. 1 and 2) is retrieved using a data replication proxy object 310. The dashed lines extending from the data replication proxy object 310 indicate references to different types of time data objects 320. In disclosed embodiments, the data replication proxy object 310 holds pointers to primary information objects, e.g., time data objects 320. Replication queries received by the data replication processing system 200 from the payroll processing system 110 may specify retrieval of a particular instance of the data replication proxy object 310 and the objects referenced by that proxy object.

The employee time data objects 320 may include, e.g., an employee time valuation result object 322, an employee time object 323, and a time account snapshot object 325. An employee time valuation result object 322 contains employee time identified according to the type of time. For example, a worker may enter 10 hours of time for a particular day, 8 hours of which are regular time and 2 hours of which are overtime. The employee time valuation result object 322 will be used by the payroll processing system 110 in a calculation of the value of this combination of time types. An employee time object 323 contains employee absence or attendance time, e.g., the number of hours of regular and overtime worked or the number of hours of sick leave or vacation taken.

The time account snapshot 325 defines a data object for handling information needed for countries which require reporting of leave liability, e.g., Australia. The time account snapshot object 325 contains leave liability information, such as, for example, leave time quotas, liabilities, and payout. In Australia, there is daily accrual of vacation time, but employees are only entitled to take it after it has accumulated over a particular period. In disclosed embodiments, rather than replicating leave data on a daily basis, a "calendar run" is performed periodically to produce data for the time account snapshot 325, e.g., at the end of the payroll period. This allows the system to report leave liability data and provide paystub information to employees regarding their currently available leave time without burdening the time and payroll systems with daily data replication.

In disclosed embodiments, countries which have periodic accrual of leave time, such as monthly or annually, may be replicated using a different method than that used for countries which require reporting of leave liability, as the underlying calculations are less complicated. Nevertheless, the view and functionality presented to the user may be configured to be the same for both approaches. Moreover, the data replication proxy may be used for both approaches, in which case the proxy will reference different sets of data objects in the time management system. For example, the time account snapshot object 325 need not be referenced in countries which do not require leave liability reporting.

In disclosed embodiments, whenever an employee time valuation result object 322, employee time object 323, or time account snapshot object 325 is created, and then approved (e.g., by an administrator or manager), the data replication controller 330 will determine if replication is necessary by checking a data replication configuration 340. For example, if the time data is a time account snapshot object 325, then replication will be performed for an Australia-specific configuration, but not for a U.S.-specific configuration. If replication is performed, the data replication controller 330 will create a corresponding data replication proxy object 310 for the approved time data. The data replication controller 330 is also triggered by time data which is changed or deleted, so that the data which has already been replicated can be modified accordingly. The data replication monitor 350 provides a status indicating errors to the data replication controller 330, as discussed in further detail below.

Figure 4:
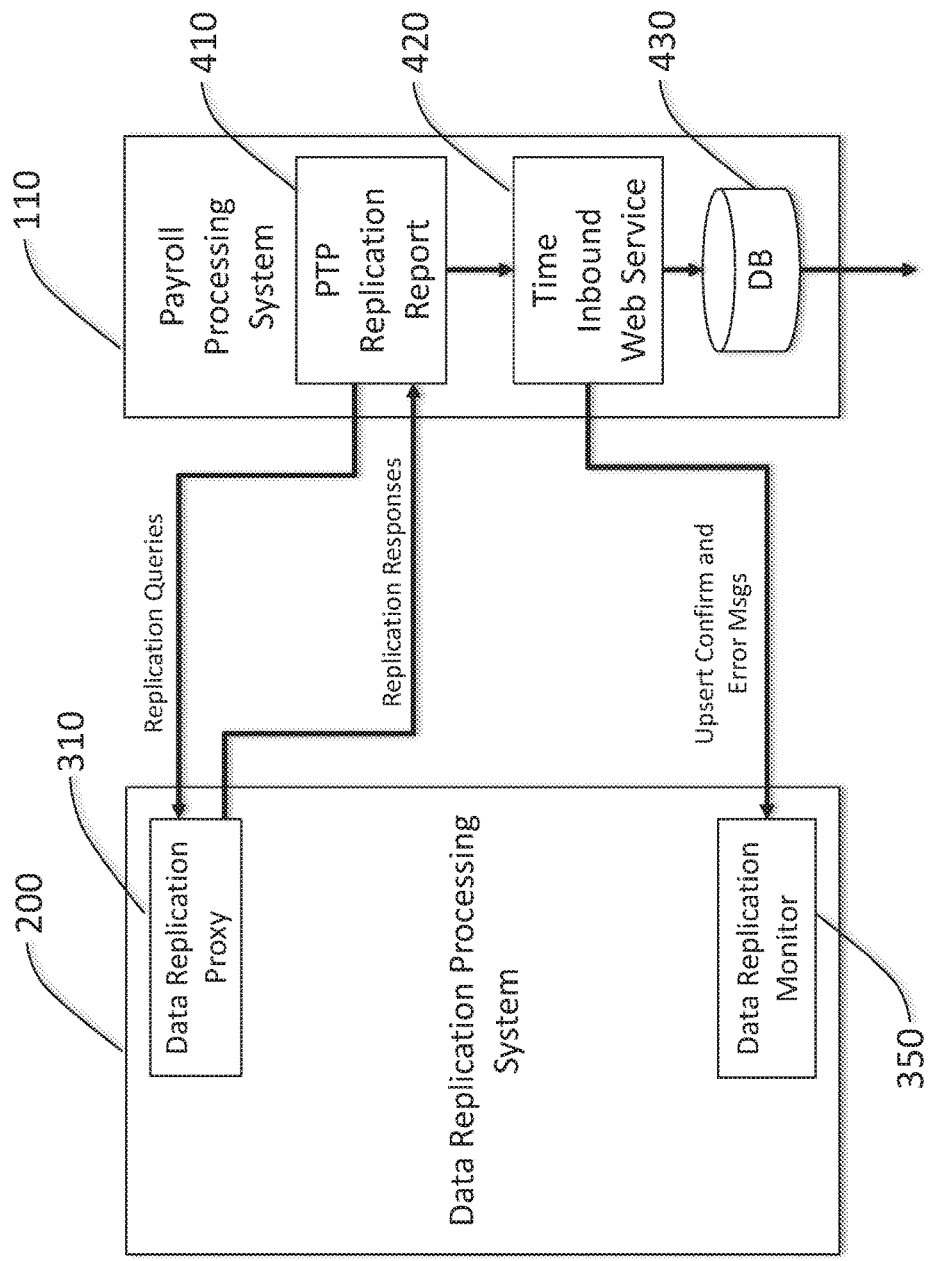
FIG. 4 is a block diagram of the data replication processing system interacting with a payroll processing system.

FIG. 4 is a block diagram of the data replication processing system 200 interacting with a payroll processing system 110. The payroll processing system 110 produces paystub data and various financial reports based on the employee time data which is replicated from the data replication processing system 200. A point-to-point (PTP) replication report 410 is used to produce replication queries which are directed to the data replication processing system 200. In disclosed embodiments, the replication queries are performed using a pull-based model in which the PTP replication report 410 polls a queue of data replication proxy objects 310.

The PTP replication report 410 is scheduled to run periodically, e.g., every 15 minutes. It sends a query to the data replication processing system 200, which sends a response to the query containing the proxy objects (if any exist) and the data referenced by the proxy object 310. The response may be, for example, in the form of a JSON structure. In disclosed embodiments, the PTP replication report 410 converts the query response into an XML data structure and posts it in the inbound queue of the time inbound web service 420. The web service 420, in turn, uses the incoming data to create records in a paystub/reporting database 430 of the payroll processing system in particular data formats, which are referred to as "infotypes." For example, the time data received by the time inbound web service 420 may be converted into infotype (IT) 2010 and stored in the database 430. The data stored in the database 430 may be output to other components and/or systems for the generation of paystubs and financial statements.

If an error occurs in the replication process, the time inbound web service 420 sends an error message to the data replication monitor 350 in the data replication processing system 200. The data replication monitor 350 provides a status indicating the error to the data replication controller 330 (see FIG. 3), which is configured to store the status information in the data replication proxy object 310 so that the replication process can be retried again at a later time. If, on the other hand, the data is successfully replicated, the data replication proxy object 310 can be deleted. In the case of successful replication of the data, the time inbound web service 420 sends a confirmation message to the data replication monitor 350. The confirmation message identifies the data replication proxy object 310 which has been replicated, as there will typically be data from numerous proxy objects in the queue of the time inbound web service 420 at a given time.

During particular periods, an employee may be blocked from replicating time data to the payroll processing system 110 because, for example, maintenance is being performed on the payroll processing system database 111. In such a case, information will be given to the data replication controller 330 (see FIG. 3), via the data replication monitor 350, to set a delay in the data replication proxy objects 310 awaiting replication so the system does not immediately retry the replication process for the proxy objects which are marked in this manner. After the delay, the replication process is retried and it may be the case that the user is no longer blocked from replicating time data.

Figure 5:
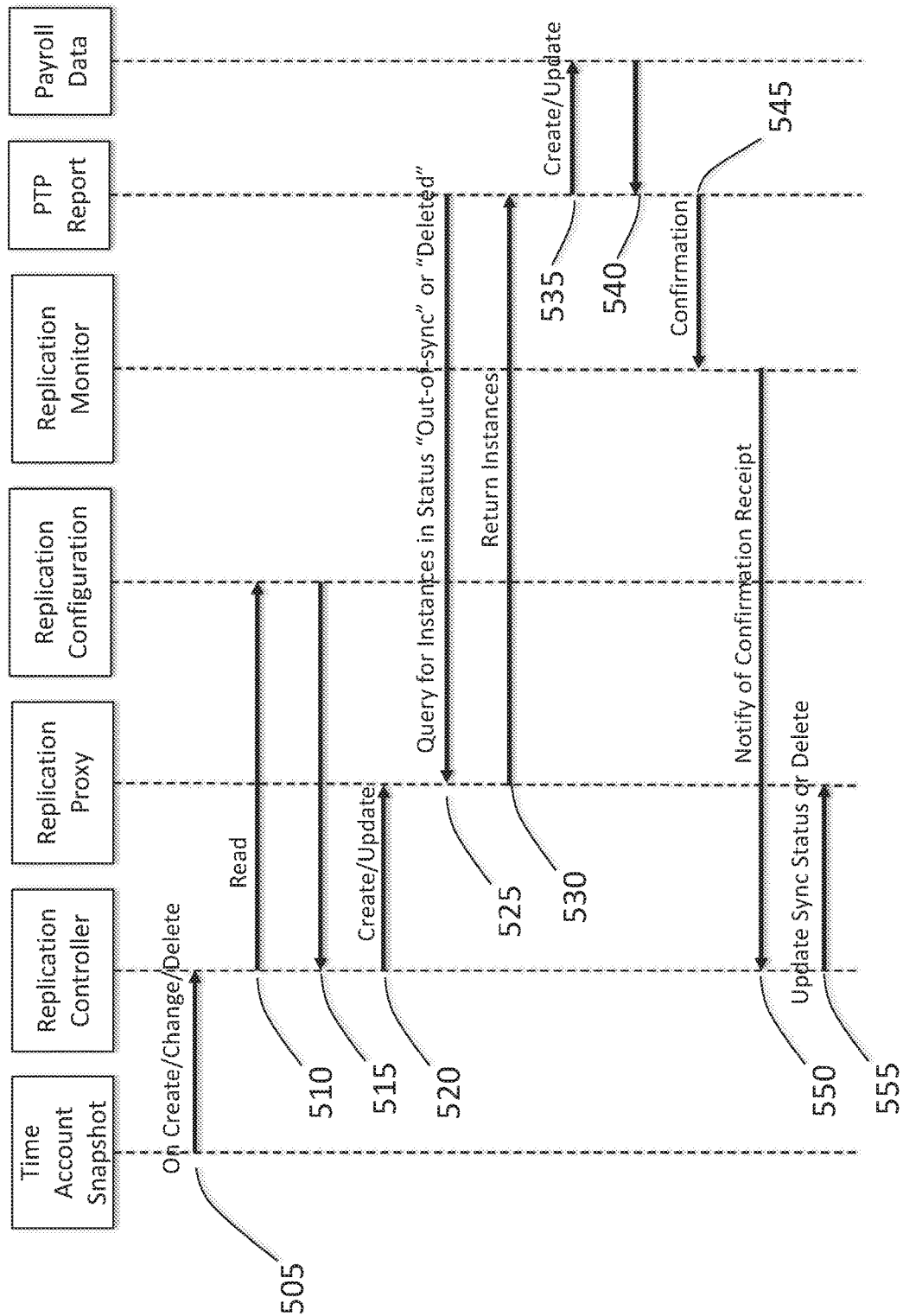
FIG. 5 is a signal flow diagram for a data replication process.

FIG. 5 is a signal flow diagram for a data replication process. In this process, whenever an employee time valuation result object, employee time object, or time account snapshot object is created 505 (and approved, if necessary), the data replication controller will determine if replication is necessary by reading a data replication configuration 510 and retrieving the configuration data 515. For example, if the time data is referenced by a time account snapshot object, then replication will be necessary for an Australia-specific configuration. In such a case, the data replication controller will create a corresponding data replication proxy object 520 for the time account snapshot. The data replication controller is also triggered by time data objects which are changed or deleted 505, so that the data which has already been replicated can be modified accordingly. In such cases, an instance of a data replication proxy object may be updated 520, rather than created.

As explained above, the payroll processing system has a PTP replication report module/functionality, which uses a scheduled point-to-point messaging process to send periodic replication queries 525 to the data replication processing system. In disclosed embodiments, the queries retrieve all instances of the data replication proxy objects which have a status "out-of-sync" or "deleted." In response to the query, the data replication processing system returns the instances having those statuses 530. The data returned in the queries is put in input queue of the time inbound web service (see FIG. 4) and is then stored in a database 535 of the payroll processing system in a format in accordance with, e.g., Infotype 2010. In the case of an updated or deleted data proxy object instance, corresponding data stored in the payroll processing system database is updated or deleted, respectively.

After an indication that the data is successfully stored 540, the payroll processing system sends a confirmation 545 to the data replication monitor, which passes an indication to the data replication controller 550. The data replication controller updates the sync status 555 to "in-sync." Alternatively, the data replication controller may delete instances of the data replication proxy objects 555 which have been successfully replicated.

In disclosed embodiments, the replicated data for entitlement and accrual balance is stored in an infotype 2010 data structure (i.e., a remuneration information data structure). The replicated data for entitlement and accrual balance may be stored in following fields of the infotype: Start Date; Wage Type; Number & Unit; and Amount. The start date for the record is the effective date in the time management system for when the calculated leave balance is valid. In disclosed embodiments, the value for the leave entitlement and accrual is stored in the amount field. The Amount field of infotype 2010 has an overall length of 13 places with two decimal places. This allows for a configuration with higher precision using five decimal places. The additional three decimal places are obtained by multiplying the value by 1000, and later dividing by 1000 in the payroll calculation. The wage type for the record is derived from the replicated time account type of the employee for each value, e.g., one for entitlement and one for the accrual. The mapping can be done using a user-configurable mapping table. The Number field may be filled with, for example, the number of accrued or entitled leave hours rounded to two decimal places. This has the advantage of being extendable to countries that require replication of hours/days rounded to two decimal places. The Amount may be configured to be left empty in such a case. The Unit field specifies whether time is measured in days or hours.

FIG. 6 shows fields of a data replication configuration object (i.e., "data ReplicationConfiguration"). The field "replicationContentType" specifies the type of time data referenced by the object, such as, for example, absences or attendance (e.g., regular and overtime hours worked). The field "replicationScenario" specifies which scenario, of a defined set of scenarios, will be used as a configuration for the replication of the data. In disclosed embodiments, each scenario defines a set of parameters applicable to time data of one or more countries, as further discussed below.

FIG. 7 shows fields of a data replication proxy object (i.e., "dataReplication Proxy"). The field "replicationContentType" specifies the type of time data referenced by the object, such as, for example, absences or attendance (e.g., regular and overtime hours worked). The field "replicationScenarioObject" specifies which scenario object, of a defined set of scenario objects, for the replication of the data referenced by the data replication proxy object. In disclosed embodiments, each scenario includes one or more scenario objects, as further discussed below.

FIG. 8 is a table showing replication scenario and corresponding replication scenario objects. For example, replication scenario "A" defines parameters corresponding to time reporting requirements for Australia. The time information for the Australian scenario includes: absences (i.e., leave time taken for vacation, sick leave, etc.); leave quota (e.g., leave time to which employee is entitled for the year); leave accrual (i.e., leave time accrued but not yet available to employee); and leave entitlement (i.e., accrued leave time which has been made available to employee for use). The time information is referenced by one or more time data objects. For the Australian scenario, absence time is associated with an "Employee Time" data object; and leave quota and liability time is associated with a "Time Account Snapshot" data object. Thus, the Employee Time data object is used for absence data (e.g., sick leave, vacation, etc.) in this scenario and the remaining information needed for paystub leave balances and leave liability reporting is handled by the Time Account Snapshot data object. In other scenarios, the Employee Time data object may also be used for attendance data (e.g., regular and overtime hours worked), in which case the Employee Time data objects would have different values for the "replicationContentType" field depending upon the type of data being referenced.

Figure 9:
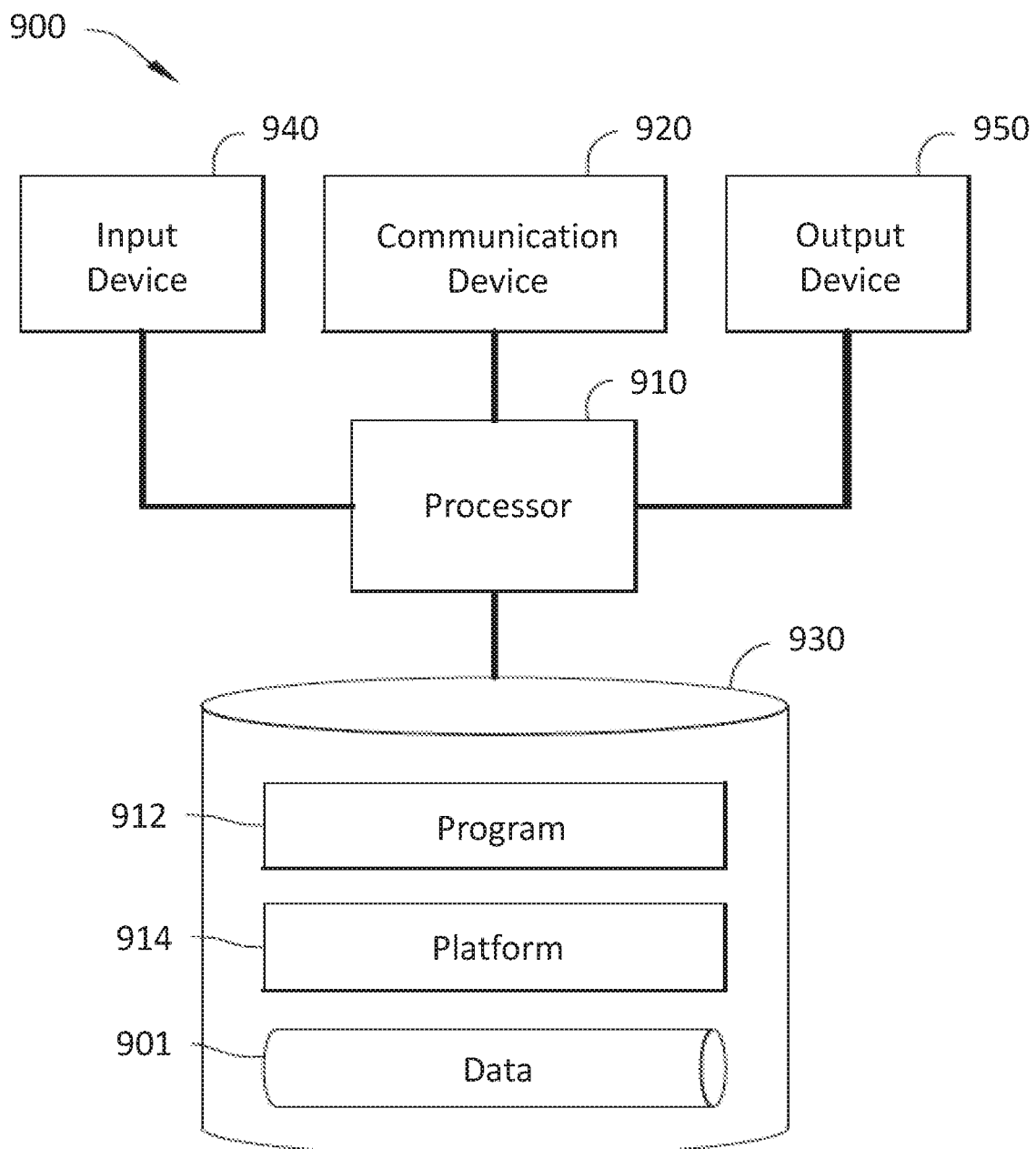
FIG. 9 is a block diagram of a system according to some embodiments.

FIG. 9 is a block diagram of apparatus 900 according to some embodiments. Apparatus 900 may comprise a general- or special-purpose computing apparatus and may execute program code to perform any of the functions described herein. Apparatus 900 may comprise an implementation of one or more elements of system 100. Apparatus 900 may include additional elements which are not shown, according to some embodiments.

Apparatus 900 includes processor 910 operatively coupled to communication device 920, data storage device/memory 930, one or more input devices 940, and one or more output devices 950. Communication device 920 may facilitate communication with external devices, such as an application server. Input device(s) 940 may comprise, for example, a keyboard, a keypad, a mouse or other pointing device, a microphone, knob or a switch, an infra-red (IR) port, a docking station, and/or a touch screen. Input device (s) 940 may be used, for example, to manipulate graphical user interfaces and to input information into apparatus 900. Output device(s) 950 may comprise, for example, a display (e.g., a display screen) a speaker, and/or a printer.

Data storage device/memory 930 may comprise any device, including combinations of magnetic storage devices (e.g., magnetic tape, hard disk drives and flash memory), optical storage devices, Read Only Memory (ROM) devices, Random Access Memory (RAM) etc.

The storage device 930 stores a program 912 and/or platform logic 914 for controlling the processor 910. The processor 910 performs instructions of the programs 912, 914, and thereby operates in accordance with any of the embodiments described herein, including but not limited to the processes.

The programs 912, 914 may be stored in a compressed, uncompiled and/or encrypted format. The programs 912, 914 may furthermore include other program elements, such as an operating system, a database management system, and/or device drivers used by the processor 910 to interface with peripheral devices.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of computing devices in communication with one another via any number of other public and/or private networks. Two or more of such computing devices of may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more computer-readable non-transitory media. Such media non-transitory media may include, for example, a fixed disk, a floppy disk, a CD-ROM, a DVD-ROM, a Flash drive, magnetic tape, and solid state RAM or ROM storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A method comprising:
reading, by a replication controller, a replication configuration upon any of creation, modification, and deletion of a first data object, the replication configuration referencing a replication scenario of a defined set of replication scenarios, the replication scenario having one or more associated replication scenario objects;

creating, by the replication controller, or changing a status of, a data replication proxy object if the first data object is an associated replication scenario object of the replication scenario, the data replication proxy object referencing the first data object;

receiving a query requesting instances of the data replication proxy object having a status of out of sync or deleted; and responding to the query with the instances of the data replication proxy object having the status of out of sync or deleted.

2. The method of claim 1, further comprising, in a payroll processing system:

receiving time data referenced by the instances of the data replication proxy object having the status of out of sync or deleted; and storing, modifying, or deleting data in a payroll time database based at least in part on the received time data and statuses of instances of the data replication proxy object corresponding to the received time data.

3. The method of claim 2, further comprising:

sending, to a data replication monitor of a time management system, confirmation messages for storing, modifying, or deleting of the data in the payroll time database, each of the confirmation messages being associated with a corresponding instance of the data replication proxy object, wherein the data replication controller deletes, or changes a status of, instances of the data replication proxy object corresponding the confirmation messages.

4. The method of claim 2, wherein the time data is received by an inbound queue of a time data web service of the payroll processing system.

5. The method of claim 1, wherein the received time data is stored in the payroll time database as Infotype 2010 data.

6. The method of claim 1, wherein the received query is a scheduled query using point-to-point messaging protocol.

7. The method of claim 1, wherein the replication scenario objects associated with the replication scenario comprise an employee time object and a time account snapshot object.

8. The method of claim 7, wherein the employee time object references data specifying absences of an employee, and the time account snapshot object references data specifying leave which the employee has accrued or leave to which the employee is entitled.

9. A system comprising:

at least one server having a processor, memory, and a network interface, said at least one server being configured to perform:

reading, by a replication controller, a replication configuration upon any of creation, modification, and deletion of a first data object, the replication configuration referencing a replication scenario of a defined set of replication scenarios, the replication scenario having one or more associated replication scenario objects;

creating, by the replication controller, or changing a status of, a data replication proxy object if the first data object is an associated replication scenario object of the replication scenario, the data replication proxy object referencing the first data object;

receiving a query requesting instances of the data replication proxy object having a status of out of sync or deleted; and responding to the query with the instances of the data replication proxy object having the status of out of sync or deleted.

10. The system of claim 9, wherein said at least one server is further configured to perform, in a payroll processing system:

receiving time data referenced by the instances of the data replication proxy object having the status of out of sync or deleted; and storing, modifying, or deleting data in a payroll time database based at least in part on the received time data and statuses of instances of the data replication proxy object corresponding to the received time data.

11. The system of claim 10, wherein said at least one server is further configured to perform:

sending, to a data replication monitor of a time management system, confirmation messages for storing, modifying, or deleting of the data in the payroll time database, each of the confirmation messages being associated with a corresponding instance of the data replication proxy object, wherein the data replication controller deletes, or changes a status of, instances of the data replication proxy object corresponding the confirmation messages.

12. The system of claim 9, wherein the replication scenario objects associated with the replication scenario comprise an employee time object and a time account snapshot object.

13. The system of claim 12, wherein the employee time object references data specifying absences of an employee, and the time account snapshot object references data specifying leave which the employee has accrued or leave to which the employee is entitled.

14. A non-transitory computer-readable medium storing program instructions executed by at least one processor of a computer system having memory, the medium comprising instructions for causing the at least one processor to perform:

reading, by a replication controller, a replication configuration upon any of creation, modification, and deletion of a first data object, the replication configuration referencing a replication scenario of a defined set of replication scenarios, the replication scenario having one or more associated replication scenario objects;

creating, by the replication controller, or changing a status of, a data replication proxy object if the first data object is an associated replication scenario object of the replication scenario, the data replication proxy object referencing the first data object;

receiving a query requesting instances of the data replication proxy object having a status of out of sync or deleted; and responding to the query with the instances of the data replication proxy object having the status of out of sync or deleted.

15. The non-transitory computer-readable medium of claim 14, wherein the medium further comprises instructions for causing the at least one processor to perform, in a payroll processing system:

receiving time data referenced by the instances of the data replication proxy object having the status of out of sync or deleted; and storing, modifying, or deleting data in a payroll time database based at least in part on the received time data and statuses of instances of the data replication proxy object corresponding to the received time data.

16. The non-transitory computer-readable medium of claim 15, wherein the medium further comprises instructions for causing the at least one processor to perform:

sending, to a data replication monitor of a time management system, confirmation messages for storing, modifying, or deleting of the data in the payroll time database, each of the confirmation messages being associated with a corresponding instance of the data replication proxy object, wherein the data replication controller deletes, or changes a status of, instances of the data replication proxy object corresponding the confirmation messages.

17. The non-transitory computer-readable medium of claim 14, wherein the replication scenario objects associated with the replication scenario comprise an employee time object and a time account snapshot object.

18. The non-transitory computer-readable medium of claim 17, wherein the employee time object references data specifying absences of an employee, and the time account snapshot object references data specifying leave which the employee has accrued or leave to which the employee is entitled.

\* \* \* \* \*